Feb. 18, 1936.  F. VICENTE  2,031,196
SHOE SOLE
Filed Dec. 17, 1934
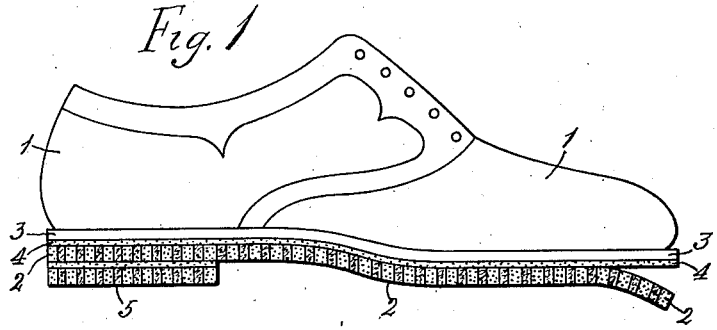
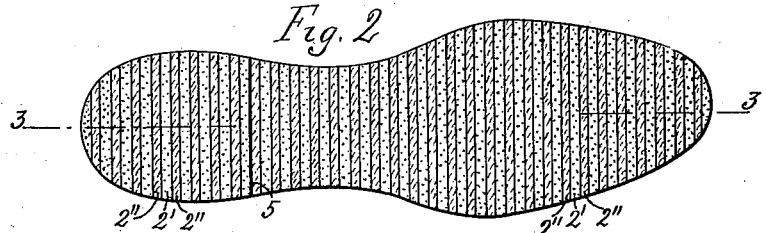
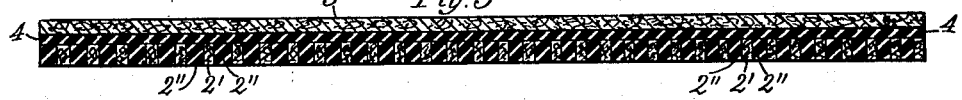
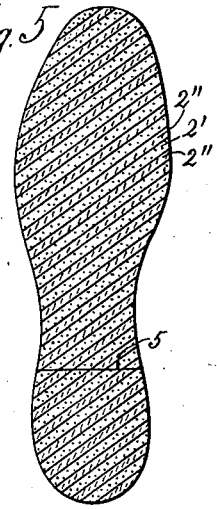 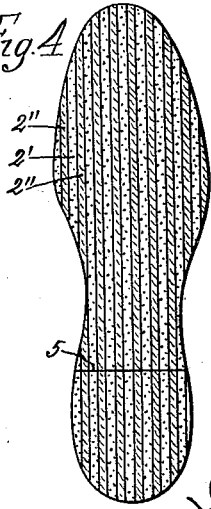
Inventor
Francisco Vicente
By B. Singer, Atty.

Patented Feb. 18, 1936

2,031,196

UNITED STATES PATENT OFFICE 2,031,196

SHOE SOLE

Francisco Vicente, Habana, Cuba

Application December 17, 1934, Serial No. 757,968
In Cuba January 3, 1934

2 Claims. (Cl. 36—59,

This invention relates to sole for any kind of shoe, and it has for its object the provision of a tread portion composed of straps made of materials of different nature, which materials can be stuck in cold, without vulcanization, a sole being obtained which is impermeable at its base, very light, soft as a cushion, noiseless and unslipping.

The invention is described with reference to the figures of the accompanying drawing, of which:

Fig. 1 is an outer elevation view of a shoe provided with the sole constituting the subject-matter of this invention.

Fig. 2 is a lower plan view of the sole.

Fig. 3 is an enlarged longitudinal vertical section view of the sole on line 3—3 of Fig. 2.

Figs. 4 and 5 are lower plan views of two modified structures of the sole.

The improved construction constituting the subject-matter of this invention consists in providing a sole for shoes, for instance a shoe the vamp 1 of which is made of leather or canvas, which sole has a tread portion 2 composed of straps of sole-leather 2' and straps of crepe rubber 2" laid parallel one to the other alternately in transverse direction and glued together by means of a rubber cement.

Preferably the base will be made of a leather sole or rim 3 covered beneath with a layer of crepe rubber 4 stitched to the sole or rim 3, said layer of crepe rubber 4 being secured to the tread portion 2 by means of a rubber cement, the shoe sole being thus completed.

The heel 5, if used, can be made in the same manner as the sole just described.

Fig. 4 shows a modified structure of the tread portion 2, in which the straps 2' of sole-leather and the straps 2" of crepe rubber are disposed longitudinally to the sole.

Fig. 5 shows another modified structure of the tread portion, in which the alternate straps of sole-leather 2' and straps of crepe rubber 2" are laid diagonally to the sole.

Due to the nature of the elements integrating the sole, they may be securely and permanently held by a rubber cement, without requiring a vulcanization, thus differentiating this sole from the soles heretofore known as composed of straps.

What I claim is:

1. A sole for shoes having a base composed of a leather sole and a lower layer of crepe rubber stitched to it, a tread portion composed of straps of sole-leather and straps of crepe rubber arranged parallel and alternately, and rubber cement uniting all said elements.

2. A sole for shoes having a base composed of a leather rim and a lower layer of crepe rubber stitched to it, a tread portion composed of straps of sole-leather and straps of crepe rubber arranged parallel and alternately in transverse direction, and rubber cement uniting all said elements.

FRANCISCO VICENTE.